(12) United States Patent
Schoessler et al.

(10) Patent No.: US 10,802,142 B2
(45) Date of Patent: Oct. 13, 2020

(54) USING ULTRASOUND TO DETECT AN ENVIRONMENT OF AN ELECTRONIC DEVICE

(71) Applicant: Samsung Electronics Company, Ltd., Suwon, Gyeong gi-Do (KR)

(72) Inventors: Philipp Schoessler, Mountain View, CA (US); Bogdana Rakova, Mountain View, CA (US)

(73) Assignee: SAMSUNG ELECTRONICS COMPANY, LTD., Suwon, Gyeonggi-Do (KR)

( * ) Notice: Subject to any disclaimer, the term of this patent is extended or adjusted under 35 U.S.C. 154(b) by 344 days.

(21) Appl. No.: 15/917,512

(22) Filed: Mar. 9, 2018

(65) Prior Publication Data
US 2019/0277966 A1 Sep. 12, 2019

(51) Int. Cl.
| | | |
|---|---|---|
| *G01S 15/89* | (2006.01) |
| *G01S 15/04* | (2006.01) |
| *G01S 15/06* | (2006.01) |
| *G01S 7/52* | (2006.01) |
| *H04M 1/725* | (2006.01) |
| *G01S 7/539* | (2006.01) |
| *G01S 15/34* | (2006.01) |

(52) U.S. Cl.
CPC ...... *G01S 15/8952* (2013.01); *G01S 7/52092* (2013.01); *G01S 7/539* (2013.01); *G01S 15/04* (2013.01); *G01S 15/06* (2013.01); *G01S 15/8956* (2013.01); *H04M 1/72569* (2013.01); *G01S 15/34* (2013.01); *H04M 2250/12* (2013.01)

(58) Field of Classification Search
CPC ...... G01S 15/8952; G01S 7/539; G01S 15/06; G01S 15/8956; G01S 7/52092; G01S 15/04; G01S 15/34; H04M 1/72569; H04M 2250/12
See application file for complete search history.

(56) References Cited

U.S. PATENT DOCUMENTS

| | | |
|---|---|---|
| 5,644,299 A | 7/1997 | Cruickshank |
| 9,542,787 B2 | 1/2017 | Blair |
| 2006/0022680 A1* | 2/2006 | Suginouchi ......... G01F 23/2962 324/635 |

(Continued)

FOREIGN PATENT DOCUMENTS

| | | | |
|---|---|---|---|
| JP | 2015228580 A | 12/2015 | |
| WO | WO-2019172686 A1 * | 9/2019 | ............. G01S 15/34 |

OTHER PUBLICATIONS

Armstrong, Elizabeth, "Smartphone Ultrasound Device Hits Market", Oct. 11, 2011.

(Continued)

*Primary Examiner* — Daniel Pihulic
(74) *Attorney, Agent, or Firm* — Baker Botts L.L.P.

(57) ABSTRACT

In one embodiment, a method includes transmitting, from a first transducer of an electronic device, a first audio signal to a surface near the electronic device. The first audio signal is generated based on a frequency sweep across a range of frequencies. The method also includes receiving, at a second transducer of the electronic device, a second audio signal that is at least partly reflected off the surface. The method then determines an attribute of the surface based on the received second audio signal.

24 Claims, 5 Drawing Sheets

(56) References Cited

U.S. PATENT DOCUMENTS

| | | | |
|---|---|---|---|
| 2009/0078049 A1* | 3/2009 | Sinha | G01N 29/46 73/623 |
| 2009/0078050 A1* | 3/2009 | Sinha | G01N 29/46 73/632 |
| 2014/0214205 A1 | 7/2014 | Kwon | |
| 2014/0378184 A1 | 12/2014 | Thorat | |
| 2015/0023138 A1 | 1/2015 | Liu | |
| 2015/0097674 A1 | 4/2015 | Mondal | |
| 2015/0294656 A1 | 10/2015 | Hanuschak | |
| 2015/0295993 A1 | 10/2015 | Hanuschak | |
| 2016/0044394 A1 | 2/2016 | Derom | |
| 2016/0057268 A1 | 2/2016 | Jiang | |
| 2016/0127867 A1 | 5/2016 | Wang | |
| 2016/0217578 A1 | 7/2016 | Can | |
| 2017/0019188 A1 | 1/2017 | Barth | |
| 2017/0019525 A1 | 1/2017 | Hannon | |
| 2017/0103440 A1 | 4/2017 | Xing | |
| 2017/0124773 A1 | 5/2017 | Busch-Sorensen | |
| 2017/0257682 A1 | 9/2017 | Shtalryd | |
| 2017/0269203 A1 | 9/2017 | Trishaun | |
| 2019/0277966 A1* | 9/2019 | Schoessler | G01S 15/34 |

OTHER PUBLICATIONS

Ozhiganov, Ivan, "NFC Alternative Transferring Data Between Mobile Devices Using Ultrasound", Oct. 9, 2013.

Biying Fu et al., Opportunities for Activity Recognition using Ultrasound Doppler Sensing on Unmodified Mobile Phones, Jun. 25-26, 2015.

International Search Report and Written Opinion for PCT/KR2019/002670, dated Jun. 24, 2019.

* cited by examiner

USING ULTRASOUND TO DETECT AN ENVIRONMENT OF AN ELECTRONIC DEVICE

TECHNICAL FIELD

This disclosure generally relates to using ultrasound to detect an environment of an electronic device.

BACKGROUND

Many electronic devices encounter a number of different objects during normal operation. For example, a smartphone may be placed onto or near many different surfaces during the course of a day. Such surfaces may include a kitchen table, a seat of a car or a phone holder in a car, a work desk, a backpack, a coffee table, a couch, and a nightstand. Other devices may also encounter a number of objects during their operation. For example, a robot vacuum cleaner may encounter different floor surfaces such as wood, carpet, tile, laminate, etc. as it vacuums. A robot vacuum may also encounter a number of obstacles such as furniture, walls, doorways, and stairs. Even non-mobile devices may encounter a number of objects during their operation. For example, a microwave may encounter a number of different types of food containers, such as plastic, ceramic, glass, and even metal.

DESCRIPTION OF EXAMPLE EMBODIMENTS

An electronic device of the present disclosure offers the ability to accurately sense different surfaces, objects, or environments of the device using at least one transducer. For example, the electronic device may be a phone or a tablet, and the transducer(s) may be the phone or tablet's speaker and microphone. Using a transducer, the device emits an ultrasonic sweep and interprets the sound waves received by a transducer. As described herein, the device interprets the received sound waves to sense surfaces or objects near the device. Then, as described more fully herein, the device can detect and identify surfaces or objects, and can use that information to enable or enhance a wide range of functionality.

As used herein, an "ultrasonic sweep" means a range of ultrasonic frequencies. In other words, by emitting an ultrasonic sweep, a device emits a range of ultrasonic frequencies. The range of ultrasonic frequencies interacts with and reflects from (i.e., echoes from) nearby objects. Because different materials (e.g., wood, cloth) are associated with different acoustic properties, the echo is a function of the sweep frequencies and the properties of the material with which the ultrasonic frequencies interact. By analyzing the echo in one or both of the temporal and frequency domains, an electronic device can use the echo to determine something about the environment it is in. For example, an electronic device can use an echo to detect a particular surface it is on or an object it is near. The device can also detect changes in its environment. For example, the device may initially detect a particular surface it is sitting on. If another object is then placed near the device, the received ultrasonic waves may indicate that an object has moved near it. As explained herein, detecting an attribute of an object can include detecting that the object is near, detecting the type of object that is near or identifying the specific object that is near, detecting some property (e.g., material properties) of the object, and/or detecting the distance of the object from the device, or any other suitable information about the object. In addition, information from other sensors, such as a GPS sensor or accelerometer, can be combined with information from an ultrasonic transducer to determine additional information about the environment of the electronic device. For example, the device may use location information and echo information to determine that it is on a table at a user's workplace rather than a table at the user's home.

Unlike conventional ultrasonic imaging techniques, the ultrasonic sweep used herein is not necessarily limited to a small range of frequencies. For example, an ultrasonic sweep may include frequencies from 18 kHz to 24 kHz. An ultrasonic sweep may include only inaudible frequencies so that people near the device do not hear the ultrasonic sweep. Moreover, as the previous example illustrates, embodiments of the present disclosure can use lower ultrasonic frequencies than those used in ultrasonic imaging techniques. Moreover, unlike in ultrasonic imaging techniques, sounds waves from embodiments of the ultrasonic sweep described herein are not necessarily injected into nearby objects. Instead, the sound waves interact with the surface of those objects. As a result, in those embodiments the electronic device does not need a couplant between the emitting transducer and the object being detected. In addition, significant power savings can be achieved because lower volumes (i.e. less power) are required to couple sound waves to a surface of an object compared to the power required to send sound waves into the volume of the object. Moreover, specialized transducers are not necessarily required to transmit and detect sound waves in accordance with the embodiments described herein. Thus, an existing electronic device that has, e.g., a speaker and a microphone can take advantage of the techniques described herein to increase the functionality of that device.

A transducer of an electronic device receives sound waves from an emitted ultrasonic sweep. The received sound waves can include sound waves from the ultrasonic sweep that have reflected from nearby objects, as well as sound waves that have coupled to the transducer. Different materials have different acoustic properties, which can be detected by the echo signature associated with those properties. For example, different materials have different acoustic properties and impedances and may differently absorb, reflect or diffuse incoming sound. At certain frequencies or ranges of frequencies, those differences are exhibited by the amplitude and frequencies of sound waves received at the device transmitting an ultrasonic sweep.

Figure 1:
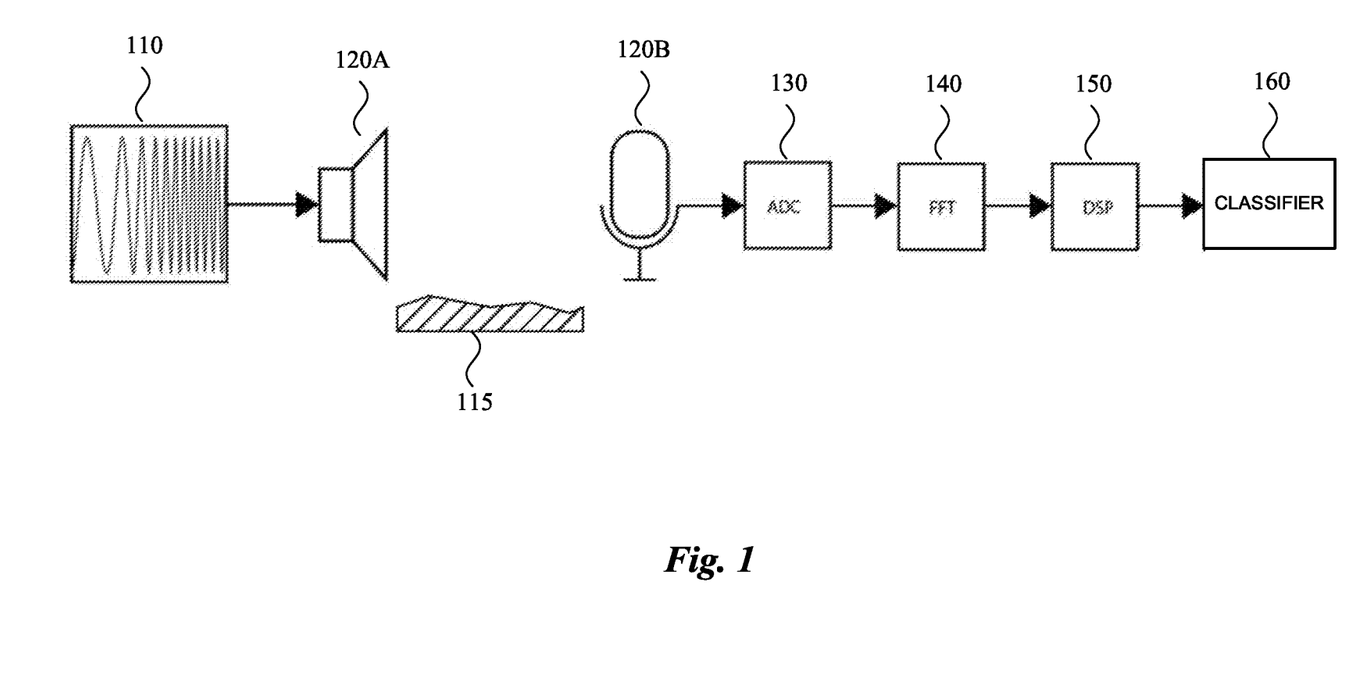
FIG. 1 illustrates example components for emitting and sensing an ultrasonic sweep.

FIG. 1 illustrates example components for emitting, sensing, and processing an ultrasonic sweep. The components may include a frequency sweep generator 110 that generates a short burst, or "chirp," of sound waves by sweeping across a particular range of frequencies. A chirp may be of any suitable length, such as for example 20 milliseconds. The volume of the chirp determines the amplitude of the emitted sound waves. For example, if used in a smartphone, the volume of a speaker emitting the chirp may be 75% of the maximum volume. In particular embodiments, the volume of a chirp may vary based on a detected object. For example, if the device does not detect any object after a chirp, the device may increase the volume and emit another chirp. This process may continue until an object is detected or until a predetermined power level or unsuccessful number of attempts is reached.

This disclosure contemplates sweeping through any suitable range(s) of frequencies. One example range may be 18 kHz to 24 kHz. In particular embodiments, a lower bound may be used so that transducer 120A does not emit audible frequencies, or emits very little power in the audible frequencies. In particular embodiments, the range of frequencies used, as well as the upper bound on the range, may depend on the capabilities of transducer 120A, the capabilities of the sampling system described below, and/or on the use case of the ultrasonic sensing system (e.g., a system requiring more detail may utilize a sweep that has a relatively higher frequency range). For example, an upper frequency of 48 kHz may be used, in particular embodiments.

In particular embodiments, frequency sweep generator 110 may sweep across a full frequency range with each chirp. In particular embodiments, frequency sweep generator 110 may sweep across subranges of a larger frequency range. For example, in particular embodiments a chirp generator may use six 5 kHz-wide chirps to sweep across a 20 kHz to 50 kHz frequency range. In particular embodiments, frequency sweep generator 110 may initially sweep across a full frequency range, followed by chirps in a subsection of the range. For example, frequency sweep generator 110 could tune to a particular subrange after a full (or, at least, larger) sweep of the range is performed and some aspect of an object is detected. For example, an initial sweep may be across a range of frequencies that correspond to the acoustic properties of a variety of materials. If metal is detected, then frequency sweep generator 110 may tune to a specific subrange that is probative of a metal. Thus, the sweep frequencies of frequency sweep generator can be tuned to achieve the best results with different materials.

Transducer 120A emits the chirp (i.e. audio signal) generated by frequency sweep generator 110. Transducer 120B receives an echo resulting from the chirp. In particular embodiments, transducers 120A and 120B may be physically separated transducers. For example, transducer 120A may be a conventional smartphone speaker, and transducer 120B may be a conventional smartphone microphone. In particular embodiments, the two transducers may operate in parallel (i.e., the speaker transmits while the microphone is receiving). In particular embodiments, transducers 120A and 120B may be a single transducer. For example, transducers 120A-B could be achieved using a single transducer (e.g. piezoelectric) that both emits the chirp and receives the corresponding echo. In particular embodiments, transducers 120A-B may operate in serial (i.e., a piezoelectric that transmits and then receives). As discussed above, the signal received by transducer 120B may include sound waves reflected or transmitted by surface 115 as well as sound waves received directly from transducer 120A.

Analog-to-digital converter (ADC) 130 may be used to digitize the raw signal received by transducer 120B. ADC 130 may be implemented as hardware or as software (e.g., in a programmable chip). In particular embodiments, an ADC system may sample the received signal as fast as possible. In any event, in order to satisfy the Nyquist limit the sampling rate must be twice the highest frequency resolved by the system. For example, if a range of 18-24 kHz is swept through by transducer 120A and the system is to resolve the 24 kHz signals, then the received signal should be sampled at least at 48 kHz.

The sampled received signal is placed into a buffer of suitable size. For example, particular embodiments may use a buffer size of 2048 bytes. This disclosure contemplates that any suitable buffer size may be used to collect a sampled, received signal. For example, as described below, a larger buffer size may be used to determine more detailed features during a fast-Fourier transform (FFT) process. As described below, one buffer worth of data may be used as a prediction or classification sample.

In particular embodiments, output from ADC 130 (or any other suitable variant of the received signal) is fed into an FFT module 140. FFT Module 140 may divide the received signal into a number of frequency bins. In particular embodiments, the number of bins used may be the maximum number of bins possible based on the buffer size and the Nyquist limit. For example, if a buffer size of 2048 is used to cache the received signal then FFT module 140 may divide the received signal into up to 1024 bins.

In particular embodiments, each bin may contain the same frequency bandwidth. For example, suppose that a device analyzes an ultrasonic sweep up to 24 kHz and uses a buffer of 2048 bits. The sampling frequency must be at least 48 kHz, and the number of bins used may be up to 1024. If the maximum number of bins are used, and if each bin contains the same bandwidth, then each bin contains 48,000/2,048 Hz=23.4375 Hz of bandwidth. Each bin may represent a feature in frequency space, as described more fully below.

FFT module 140 may use the entire spectrum of the received signal, or it may focus on one or more regions of interest. For example, if an ultrasonic sweep emits frequencies in an inaudible 18 kHz to 24 kHz band, then the region of interest may correspond to 18 kHz to 24 kHz and the corresponding bins associated with those frequencies. Thus, using the example above, the region of interest may correspond to bin numbers 768 (i.e., 18,000/23.4375) to bin number 1024 (24,000/23.4375). This disclosure contemplates that there may be multiple regions of interest and corresponding frequency bins in a received signal.

In particular embodiments, each bin may represent a feature in a feature vector having dimensions corresponding to the number of bins used. For example, using the example above, a raw feature vector corresponding to bins 768-1024 (i.e., a 257-dimensional raw feature vector) may be used to represent the signal (or, in particular embodiments, the region of interest of the signal) received as a result of an ultrasonic sweep. In particular embodiments, FFT module 140 may use a sliding moving average with a window size of, e.g., 10 samples over the raw feature vector. For example, the sliding moving average may calculate the average of an initial 10 samples (i.e., 10 buffer's worth of data). The next average calculation uses an additional sample (e.g., sample 2-11) and calculates the sliding moving average of those samples. Similarly, the next average calculation uses an additional sample (e.g., samples 3-12) and calculates the sliding moving average of those samples. The moving average, also called rolling mean, may use a finite-impulse response filter to smooth out relatively short-term fluctuations and highlight longer-term (e.g. over 10 samples) trends. While this disclosure discusses using a window size of 10 samples, this disclosure contemplates using any suitable window size for a sliding moving average.

Figure 2:
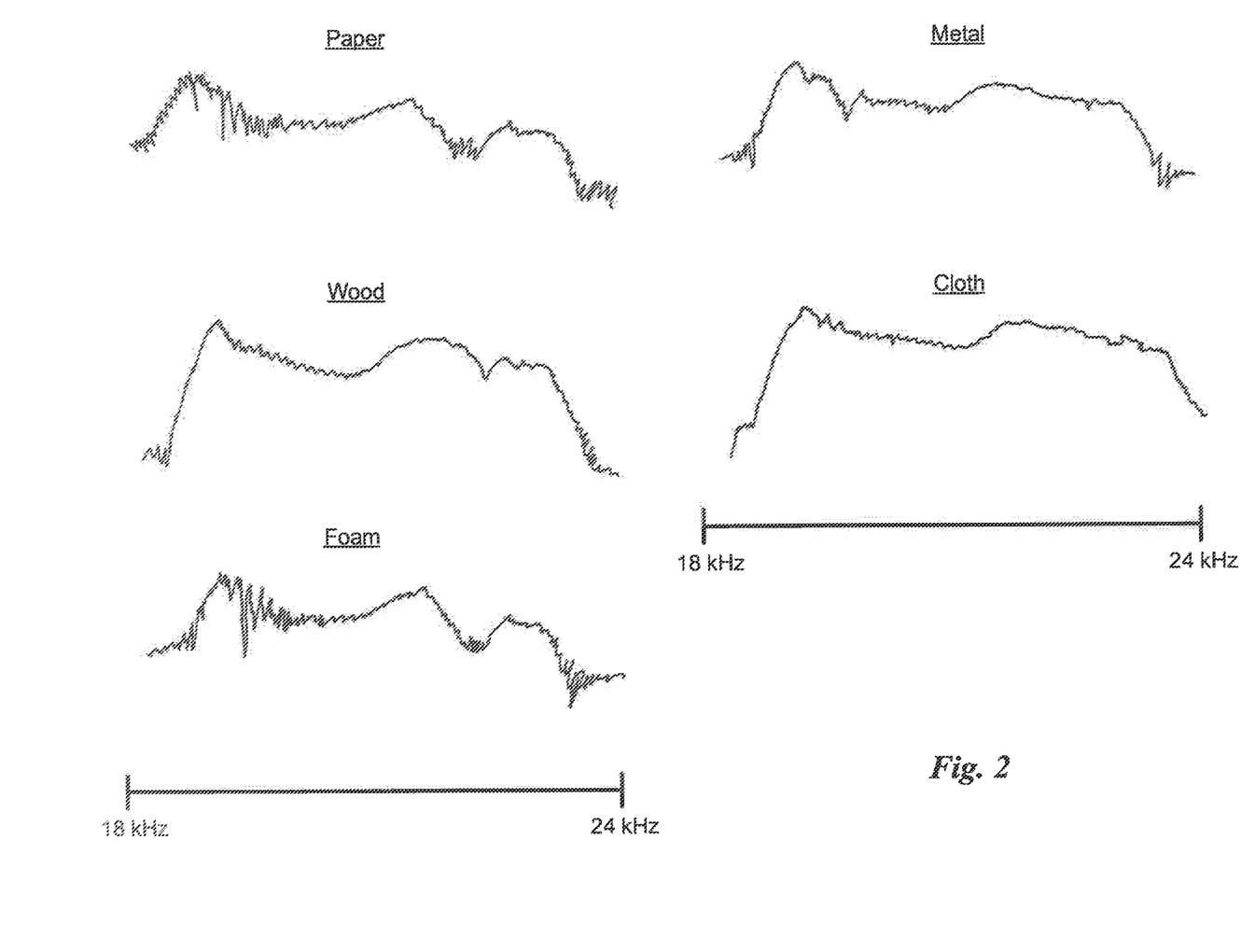
FIG. 2 illustrates example material signatures corresponding to audio signals received from example ultrasonic sweeps.

In particular embodiments, preprocessing may be performed on the output of FFT module 140. As one example, digital signal processor ("DSP") 150 may standardize a resulting feature vector, for example to normalize the FFT sample so that it has zero mean and unit-variance. For example, standardization may include subtracting the mean value of the sample (or, if applicable, the region of interest(s) in the sample) from each feature in the vector (i.e., from each bin described above) and dividing that result by the standard deviation of the sample (or, if applicable, the region of interest(s) in the sample). This disclosure contemplates that any suitable processing may be performed by any suitable combination of appropriate hardware components, which may execute any suitable preprocessing software. FIG. 2 illustrates example normalized received signals as output by a spectrogram. As illustrated, different materials have different signatures in an 18 kHz to 24 kHz frequency range.

Figure 3:
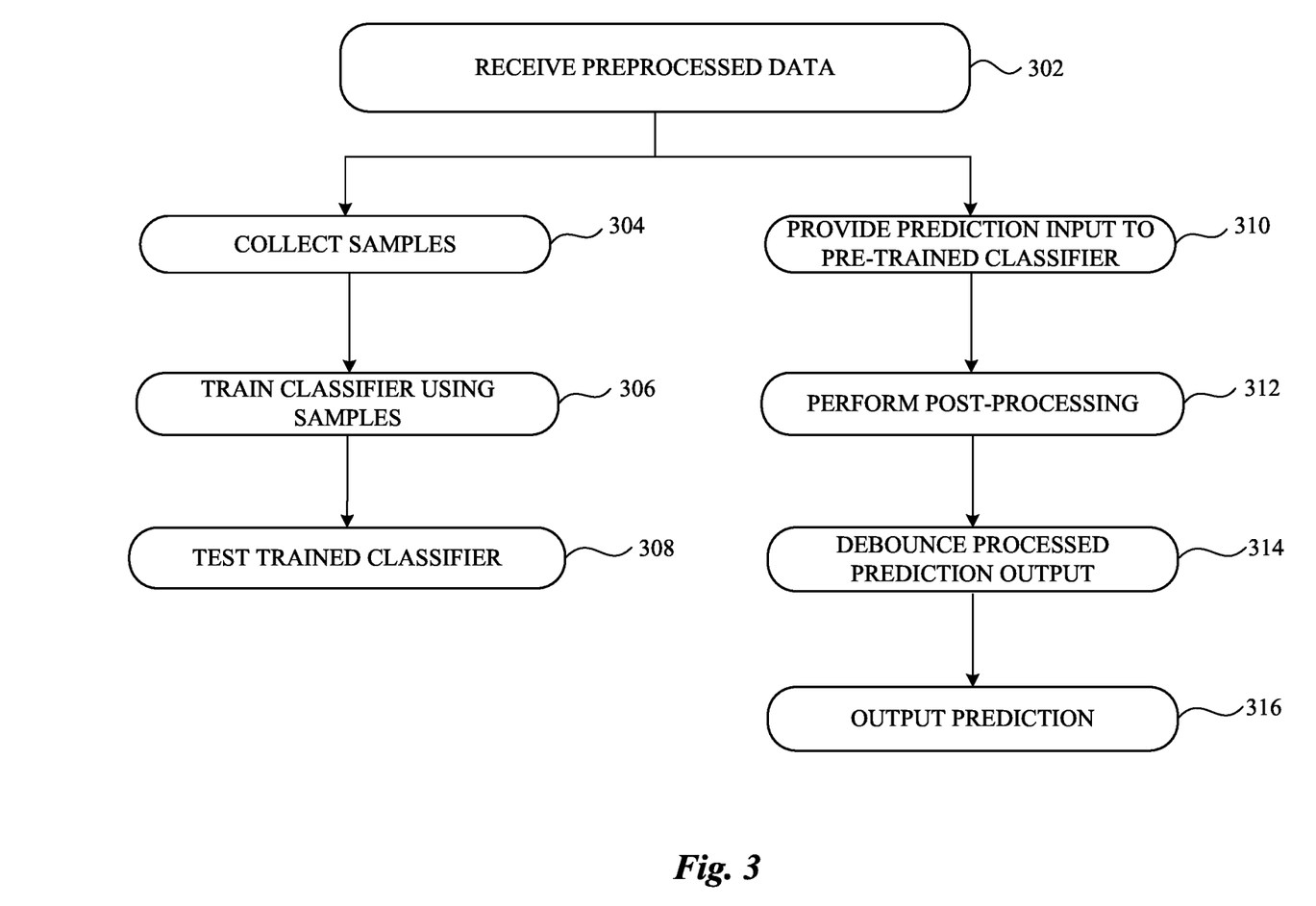
FIG. 3 illustrates an example diagram for machine learning training and prediction.

The output of DSP 150 (i.e., the preprocessed raw feature vector) may be input into a machine leaning classifier. FIG. 3 illustrates example steps executed by an example machine-learning classifier 160. As illustrated in FIG. 3, the classifier may receive preprocessed data in step 302.

As illustrated in FIG. 3, a machine-learning classifier 160 may perform training, prediction, or both. Either or both of training and prediction may use a sliding moving average of a suitable number of samples as input, such as the sliding moving average of 10 samples described above. For training, the machine-learning classifier can train specific machine-learning classifiers. This disclosure contemplates that any suitable machine-learning technique can be used to train machine-learning classifier 160. For example, support vector machines (SVM) may be one machine-learning technique used to train classifier 160. In particular embodiments, an SVM classifier is a discriminative classifier that builds optimal hyperplanes between the data samples in the high-dimensional space of feature vectors.

To train machine-learning classifier 160, a suitable number of training samples (which may be one buffer's worth of data or may be a sliding moving average of a suitable number of samples) are collected and used to train the classifier, as illustrated in steps 304 and 306. For example, 300 samples may be used to train a classifier. In particular embodiments, a training may be performed on each of a number of particular subranges of a larger frequency range. In particular embodiments, training may be performed using samples obtained as a result of sweeping across an entire frequency range.

In particular embodiments, the performance of a trained classifier may be determined by presenting the trained classifier with a test sample or set of samples and evaluating the classifier's prediction, as illustrated in step 308. Training may continue until the classifier achieves accurate classification at rates higher than a threshold rate, such as 90%, 95%, 99%, 99.5%, or higher or lower.

In particular embodiments, training may be performed by a manufacturer of an electronic device or a particular software application on an electronic device. For example, a manufacturer of a robot vacuum may train a classifier of the vacuum across a range of surface materials before selling the vacuum. In particular embodiments, training may occur when an electronic device encounters an unknown surface. For example, the device may train using samples from the surface and then query a user of the device or a back-end (e.g., cloud-based or server-based) database for the identity of the device. In particular embodiments, a classifier may train at the request of a user. For example, a user may select an interactive element on a graphical user interface (GUI) of the device or a physical interactive element (such as a push button) that causes the device to undergo training.

This disclosure contemplates that training and classification data may be stored in any suitable location and accessed by any suitable device. For example, training and classification data may be stored on a local store of a user's device, such as a smartphone. The training and classification data may or may not be accessible by other devices. For example, a device trained to detect a user's particular nightstand may not be shared with other devices or may be shared only with devices authorized by the user. As another example, training on surfaces that are not unique to a user may be shared with other devices. In particular embodiments, training and classification data may be stored on a server device accessible by the electronic device. In particular embodiments, results of a training may be used to update a profile associated with the user, a device, a surface or material, a product, or any suitable combination thereof. For example, training on a particular table made of a particular type of wood may be used to update profiles for "table," "wood," and the particular type of table (e.g., the make and manufacturer of the table).

As illustrated in FIG. 3, a classifier may include prediction capabilities. FIG. 3 illustrates example steps a predictor may perform. The predictor may receive prediction input, which may be a buffer's worth of data or a sliding moving average of a set of samples, as described above. As an output of step 310, the predictor outputs the classification results in the form of probabilities or classification scores. Step 312 may perform post processing on those outputs. For example, post processing in step 312 may include further calibrating the classification scores or probabilities by applying suitable statistical filters. The filters may be similar to the filters applied as part of the preprocessing steps, and may include applying a moving average, standardization, or other suitable filters. Step 312 applies one or more statistical techniques to select, based on the set of probabilities or classification scores, the appropriate classification result outputted in step 310. For example, step 312 may output the label of the classification output associated with the highest probability. Thus, in such cases, the output of step 312 is the predicted class label (e.g. "wood"). At step 314, a predictor may "debounce" the prediction output samples it receives by requiring that a particular threshold number N of samples in a row (or a particular portion of sample N out of Y samples) get classified as the same thing. For example, a predictor may require that 10 samples (whether 10 buffers worth of data or 10 sliding moving averages of a suitable number of data samples) get classified as the same thing (e.g., "wood") before classifying the object or surface that the electronic device is near. At step 316, a prediction is output by the predictor.

Figure 4:
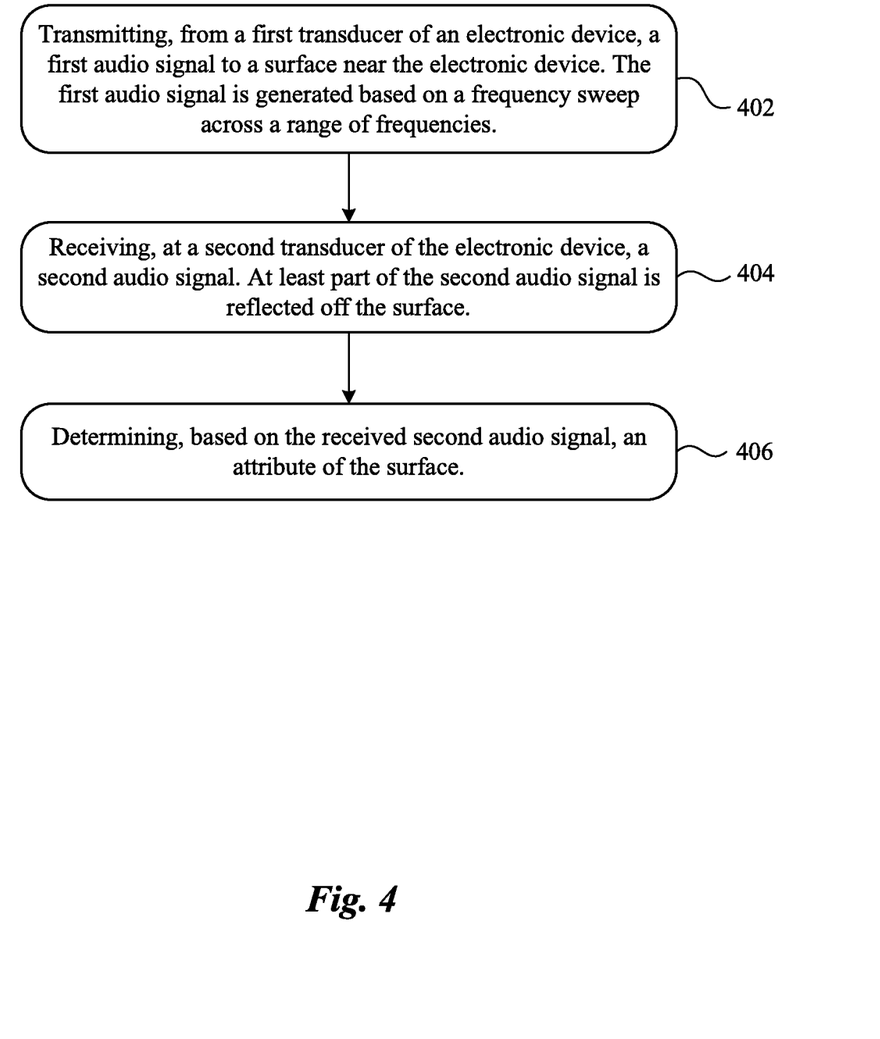
FIG. 4 illustrates an example method for emitting and sensing an ultrasonic sweep.

FIG. 4 illustrates an example method for emitting and sensing a sweep of sound waves. At step 402, the method includes transmitting, from a first transducer of an electronic device, a first audio signal to a surface near the electronic device. As illustrated in step 402, the first audio signal may be generated based on a frequency sweep across a range of frequencies. At step 404, the method includes receiving, at a second transducer of the electronic device, a second audio signal. As illustrated in step 404, at least part of the second audio signal may be reflected off the surface. At step 406, the method includes determining, based on the received second audio signal, an attribute of the surface, such as a material of the surface, an identification of the object the surface is part of, an identification of the distance between the object and the device, etc. As illustrated in FIG. 4, while embodiments of this disclosure relates to an ultrasonic sweep, this disclosure contemplates that audio signal may be more generally used by certain embodiments described herein. For example, the components of FIG. 1 may be used to generate, transmit, receive, and analyze an audio signal swept through a range of frequencies.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining something about a surface of an object based on transmitting and receiving an audio signal, this disclosure contemplates any suitable method for determining something about a surface of an object based on transmitting and receiving an audio signal, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

In particular embodiments, an ultrasonic sweep may periodically occur at, e.g., predetermined intervals. In particular embodiments, an ultrasonic sweep may occur only when a device is relatively stationary. For example, a smartphone may have a sensor such as an accelerometer that detects movement of the device. An ultrasonic sweep may be performed only when the smartphone is stationery, e.g., for a predetermined period of time. In particular embodiments, an ultrasonic sweep may be performed whenever a state machine in the electronic device is triggered. For example, a state machine may be triggered when the device is stationary for a particular amount of time or is in a particular orientation for a particular amount of time. As another example, a state machine may be triggered when the device is at a particular location (e.g., home or work). As another example, a state machine may be triggered based on any suitable sensor. For example, a robot vacuum cleaner may generate an ultrasonic sweep whenever the amount of power used to move the vacuum changes (e.g., if the vacuum moves from carpet to laminate flooring).

In particular embodiments, the ultrasonic system described herein can be combined with output from other sensors such as an accelerometer, gyroscope, GPS sensor, Wi-Fi sensor, Bluetooth® etc. If, for example, desks at two different physical locations are made of the same materials, an electronic device can use an ultrasonic sweep to identify the desk and use a GPS signal or Wi-Fi SSID to identify the particular desk (e.g., home or work) that the device is near. As another example, a gyroscope may be used to identify the orientation of the device, which may provide information about the context of the device. For example, if a smartphone is laying down on plastic surface, the smartphone may infer that it is on a plastic piece of furniture. In contrast, if the phone is upright next to a plastic surface then the phone is probably not sitting on a piece of furniture and may instead be estimated to be, e.g., in a plastic phone holder in a car.

In particular embodiments, a distance to an object from an electronic device can be estimated by the amplitude of received sound waves from an ultrasonic sweep emitted by the device. If for example, an apple is placed in front of a smartphone and moved away or towards the phone, the amplitude in certain frequencies bins will change in a particular manner, such as a linear or near-linear decrease or increase in amplitude, respectively. Thus, the amplitude of extracted features in a feature vector can be used to estimate the distance to an object, as well as the object itself or material of the object.

In particular embodiments, an object or one or more aspects of an object may be detected by an ultrasonic system. As used herein, such detection may be referred to as detecting an attribute of a surface. Attributes that can be detected include a type of material used on the surface of the object, the shape of the object, or the proximity of the object, all based on the acoustic properties of the object that result in a unique signature when an ultrasonic sweep is delivered to the object. In particular embodiments, deviation from baseline sweep can be used to determine the presence of objects. For example, a smartphone may detect that it is sitting on a table as a result of received ultrasonic waves and a resulting prediction of "table." If a signature from a subsequent sweep in the same frequency range changes without the smartphone detecting that it has been moved, then the changed signature may be understood to indicate the presence of another object or that an object has moved nearer to or farther from the device. The baseline signature may be removed from the changed signature, thus leaving a signal that represents the change in environment (e.g., the presence of, or change in distance of, an object) of the smartphone. In particular embodiments a thickness of a surface may be detected if an ultrasonic sweep of sufficient power is used. Other attributes of an object may be detected based on the signature from the ultrasonic sweep. For example, the tissues in fruits and vegetables undergo changes in elasticity as the fruit or vegetable ripens. Thus, an echo from a particular sweep may identify the ripeness of a fruit or vegetable.

In particular embodiments, the distance between a device and an object may be estimated using an ultrasonic sweep. As described above, the distance may be estimated using a change in amplitude of one or more features of a received signal. In particular embodiments, the distance detectable by an ultrasonic system may depend on the frequencies used in an ultrasonic sweep, the power of the emitted signal, the size or volume of the object, and the orientation of the object relative to the ultrasonic emitter(s). For example, an object such as a tablet may be detected up to 15 centimeters away while a larger surface such as a wall or large display may be detected up to a few feet away.

In particular embodiments, a user can associate a particular signature or class of signatures (e.g., identifying a certain type of material) with a particular context. For example, if a user's smartphone identifies a marble counter and the user associates that signature with "kitchen," then subsequent detections of that signature (e.g., that specific signature or, in particular embodiments, any signature predicted to result from a marble surface) will indicate that the phone is in the kitchen. In particular embodiments, the user can specify the granularity of the signature (e.g., "marble" or "this specific marble counter" or "this specific location on this specific marble counter") to associate with a particular context. In particular embodiments, a user can specify a context in a training command, such as voice command "kitchen, train," which will result in the phone training and associating the received signature with the context "kitchen." In particular embodiments, contexts may be automatically associated with particular signatures. For example, a manufacturer of, e.g., a coffee table, may supply its signature to a database, and an electronic device having access to that database may associate a corresponding signature with "living room." As another example, a signature corresponding to porcelain may be associated with the context "bathroom." As described elsewhere herein, other sensor data may be used in combination with a signature to determine a particular context.

The detection of an object, surface, context, or combination thereof may be used to facilitate a number of functionalities. For example, if an office desk is detected by a smartphone or computer based on an ultrasonic sweep (with, in particular embodiments, output from other sensors), then productivity applications may be brought to the foreground of the computer and notifications could be muted or filtered such that only work-related notifications are allowed.

As another example, if a smartphone detects that a user is in the car then the phone could disable phone calls, open a map application, limit or prohibit distracting notifications, automatically pair or enable Bluetooth®, or other suitable functionality.

As another example, if a nightstand is detected by a smartphone, then the phone could set its alarm clock and activate a mode in which noises emitted by the phone are limited. As another example, if a kitchen table is detected by a smartphone, then the phone could automatically pair to speakers in range of the smartphone. The phone could also trigger events at other smart devices, e.g., if the smart devices are networked with the phone over the internet or a local network. For example, if the phone detects a coffee table or entry table then the phone could initiate turning on a TV, turning on lights, setting a thermostat, etc.

As another example, if a device such as a phone detects that it is submerged in liquid (e.g., if the phone is dropped into a glass or a lake), then it may automatically shut itself off to prevent damages to internal electronics. As another example, if the phone detects that it is in a backpack or other type of carrying bag (e.g., purse) then the phone could automatically enter an energy saving mode. As another example, if a device such as a phone detects that it is close to an edge of a surface, then it may notify the user so that the user can prevent the device from falling. In particular embodiments, a device could map a surface using multiple sweeps as the device is moved around the surface.

In particular embodiments, a functionality associated with a particular object, surface, context, or combination thereof being detected may be determined at least in part by a user. For example, a user could define events that should occur in response to a particular detection event. In addition, the user could define events on other devices that should occur if the other devices are connected to the device containing the ultrasonic system. For example, a user could choose to activate a smart thermostat in the user's home that is networked with the user's smartphone (e.g., over a Wi-Fi network) when the user's phone detects a signature associated with the user's home.

In particular embodiments, an ultrasonic sweep may be used to assist in indoor positioning of a device and/or determine the location of a device. For example, a phone could use information from, e.g., a Wi-Fi signal to locate the phone using the Wi-Fi signal and a signature from an ultrasonic sweep. Thus, for example, the device could locate itself with reference to particular part of a house (e.g., upstairs or downstairs); a particular room (e.g., kitchen or bedroom); and/or with reference to a particular place in a particular room (e.g., in the couch or on the bed). In particular embodiments, a user could then locate his/her phone more accurately if misplaced. In addition or the alternative, the phone could show targeted notifications based on its location. For example, the phone could provide notifications about what is playing on TV if it is in the living room. The detection could be used to enable additional functionality, such as turning on lights for a room/area the phone is detected to be in.

While this disclosure describes several embodiments in the context of an ultrasonic sweep in a phone or tablet, this disclosure contemplates that a system for emitting and sensing an ultrasonic sweep could be implemented in any suitable device. For example, in robot vacuum cleaners the system could identify the surface currently being cleaned and, in particular embodiments, apply different cleaning settings based on what surface is detected. As another example, the system could be implemented in a wearable device such as a watch and could be used to, e.g., determine if the wearable device is being worn by the user or not (i.e., based on detecting the presence of clothing or human skin). In fact, particular embodiments could automatically identify the user wearing the device based on, e.g., a signature that uniquely corresponds to that user's clothing or body. As another example, the system could be implemented in a microwave where it could be used to, e.g., determine if the user has placed non-microwaveable materials (such as metal or certain plastics) into the microwave. The microwave may disable powering on when such materials are present.

Figure 5:
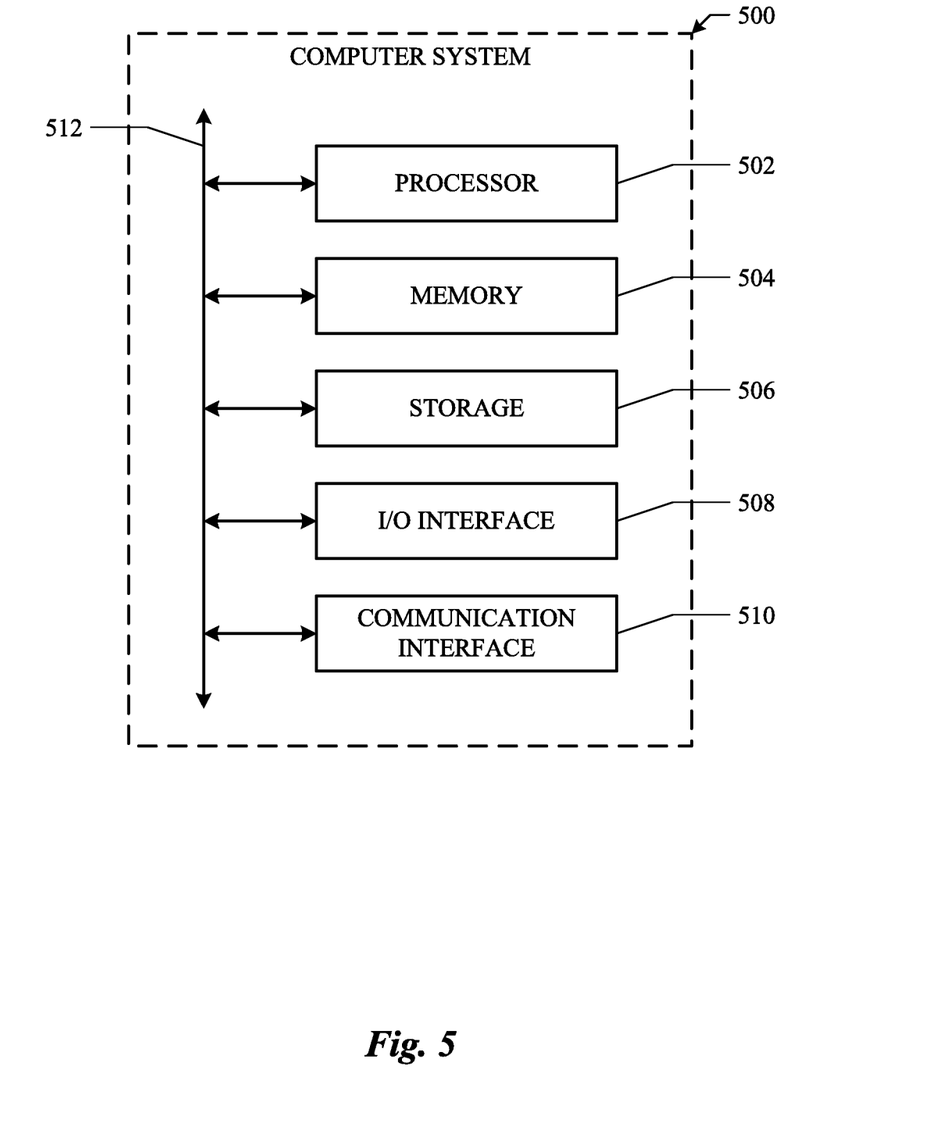
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   transmitting, from a first transducer of an electronic device, a first audio signal to a surface near the electronic device, wherein the first audio signal is generated based on a frequency sweep across a range of frequencies;
   receiving, at a second transducer of the electronic device, a second audio signal, wherein at least part of the second audio signal is reflected off the surface; and
   determining, based on the received second audio signal, an attribute of the surface based on a comparison of amplitudes of the received second audio signal at a plurality of frequencies to frequency signatures corresponding to attributes of objects.

2. The method of claim 1, wherein the range of frequencies includes ultrasonic frequencies.

3. The method of claim 2, wherein there is no ultrasonic couplant between the first transducer and the surface.

4. The method of claim 1, wherein the range of frequencies comprises frequencies in a range of 18 kHz to 24 kHz.

5. The method of claim 1, wherein:
   the range of frequencies comprises a plurality of subranges; and
   the method further comprises tuning, based on the received second audio signal, the first transducer to transmit at one or more of the plurality of subranges.

6. The method of claim 1, wherein:
   the first transducer comprises a speaker; and
   the second transducer comprises a microphone.

7. The method of claim 1, wherein the first transducer is the second transducer.

8. The method of claim 1 wherein:
   at least part of the second audio signal is a result of coupling between the first transducer and the second transducer; and determining, based on the received second audio signal, the attribute of the surface comprises determining the attribute of the surface based at least on:
the part of the second audio signal that is the result of coupling between the first transducer and the second transducer; and
the part of the second audio signal that is reflected off the surface.

9. The method of claim 1, wherein determining, based on the received second audio signal, the attribute of the surface comprises:
analyzing the received second audio signal in a frequency space;
dividing the frequency space into a plurality of bins, each bin corresponding to a frequency band;
comparing an amplitude of the received second audio signal in one or more of the plurality of bins to one or more corresponding bins in a signature, each signature corresponding to one or more acoustic properties of one or more objects; and
determining, based on the comparison, the attribute of the surface.

10. The method of claim 1, wherein determining, based on the received second audio signal, the attribute of the surface comprises:
determining, by a machine-learning classifier, one or more attributes of the received second audio signal; and
associating the one or more attributes of the received second audio signal with the attribute of the surface.

11. The method of claim 10, wherein associating the one or more attributes of the received second audio signal with the attribute of the surface comprises receiving, from a user of the electronic device, an identification of the attribute of the surface.

12. The method of claim 10, wherein associating the one or more attributes of the received second audio signal with the attribute of the surface comprises accessing, from a database of signatures, an identification of the attribute of the surface associated with a signature corresponding to the one or more attributes of the received second audio signal, wherein each signature corresponds to one or more acoustic properties of one or more objects.

13. The method of claim 1, wherein determining the attribute of the surface comprises determining a type of material of the surface.

14. The method of claim 1, further comprising determining, based on the attribute of the surface, a context of the electronic device.

15. The method of claim 14, wherein:
the electronic device comprises one or more sensors; and
the context of the device is determined based on output from at least one of the sensors and the attribute of the surface.

16. The method of claim 14, wherein the context comprises a location of the electronic device.

17. The method of claim 16, further comprising enabling or disabling, based on the location of the electric device, one or more functionalities of the electronic device.

18. The method of claim 17, wherein the functionality comprises a functionality of an application on the electronic device.

19. The method of claim 17, wherein the functionality comprises a particular mode of the electronic device.

20. The method of claim 1, wherein determining the attribute of the surface comprises determining the presence of an object comprising the surface.

21. The method of claim 20, further comprising determining, based on the received second audio signal, a distance between the object and the electronic device.

22. The method of claim 1, wherein determining the attribute of the surface comprises identifying an object comprising the surface.

23. An apparatus comprising:
a first transducer;
a second transducer; and
one or more non-transitory storage media embodying instructions and one or more processors operable to execute the instructions to:
initiate transmission, from the first transducer, of a first audio signal to a surface near the apparatus, wherein the first audio signal is generated based on a frequency sweep across a range of frequencies;
process a second audio signal, wherein the second audio signal is received by the second transducer and at least part of the second audio signal is reflected off the surface; and
determine, based on the second audio signal, an attribute of the surface based on a comparison of amplitudes of the received second audio signal at a plurality of frequencies to frequency signatures corresponding to attributes of objects.

24. One or more non-transitory computer-readable storage media embodying instructions that when executed by one or more processors cause the one or more processors to:
initiate transmission, from a first transducer of an electronic device, of a first audio signal to a surface near the apparatus, wherein the first audio signal is generated based on a frequency sweep across a range of frequencies;
process a second audio signal, wherein the second audio signal is received by a second transducer of the electronic device and at least part of the second audio signal is reflected off the surface; and
determine, based on the second audio signal, an attribute of the surface based on a comparison of amplitudes of the received second audio signal at a plurality of frequencies to frequency signatures corresponding to attributes of objects.

* * * * *